United States Patent [19]

Missimer et al.

[11] Patent Number: 5,009,073
[45] Date of Patent: Apr. 23, 1991

[54] FAST CYCLE CRYOGENIC FLEX PROBE

[75] Inventors: Dale J. Missimer, San Anselmo; David T. Fyfe, Jr., Novato; Joseph J. Housman, Sebastapol; Scott M. Forrest, Half Moon Bay, all of Calif.

[73] Assignee: Marin Tek, Inc., San Rafael, Calif.

[21] Appl. No.: 517,325

[22] Filed: May 1, 1990

[51] Int. Cl.$^5$ .................................... F25B 19/00
[52] U.S. Cl. .................... 62/51.1; 62/50.7; 62/55.5
[58] Field of Search .............. 62/51.1, 55.5, 50.7

[56] References Cited

U.S. PATENT DOCUMENTS

| | | | |
|---|---|---|---|
| 4,516,404 | 5/1985 | Laskaris | 62/51.1 |
| 4,522,034 | 6/1985 | Laskaris | 62/51.1 |
| 4,526,015 | 7/1985 | Laskaris | 62/51.1 |
| 4,535,596 | 8/1985 | Laskaris | 62/51.1 |
| 4,633,682 | 1/1987 | Laskaris | 62/51.1 |
| 4,635,450 | 1/1987 | Laskaris | 62/51.1 |
| 4,635,451 | 1/1987 | Laskaris | 62/51.1 |
| 4,667,486 | 5/1987 | Miller et al. | 62/51.1 |
| 4,667,487 | 5/1987 | Miller et al. | 62/51.1 |
| 4,950,901 | 8/1990 | Jones et al. | 62/51.1 |

Primary Examiner—Ronald C. Capossela
Attorney, Agent, or Firm—Owen, Wickersham & Erickson

[57] ABSTRACT

An elongated fast cycle cryopump device connected to a refrigerant source has a rigid head section adapted to extend through a pass-through opening of a vacuum chamber. The head end section has a feed tube and a return flow passage, the feed tube being connected to a valve for selectively receiving either a relatively cold refrigerant or a relatively hot refrigerant during different phases of operation. A flexible probe section connected to the rigid head end section is capable of being shaped in different ways to assume a preselected or variable configuration within the vacuum chamber workspace and includes a flexible feed tube connected to the feed tube of the head end section for carrying the refrigerants passing through the head section outwardly to the end of the flexible probe section. A flexible outer tubular member surrounding the flexible feed tube provides a return passage for the refrigerants along the flexible probe section and through the head section. When cold refrigerant flows in the flexible probe section during a vacuum cycle within a chamber, water vapor is condensed on its outer surface, and at the end of the cycle when hot refrigerant is flowing in the probe, condensed water vapor is released from the flexible probe section to the surrounding atmosphere.

14 Claims, 3 Drawing Sheets

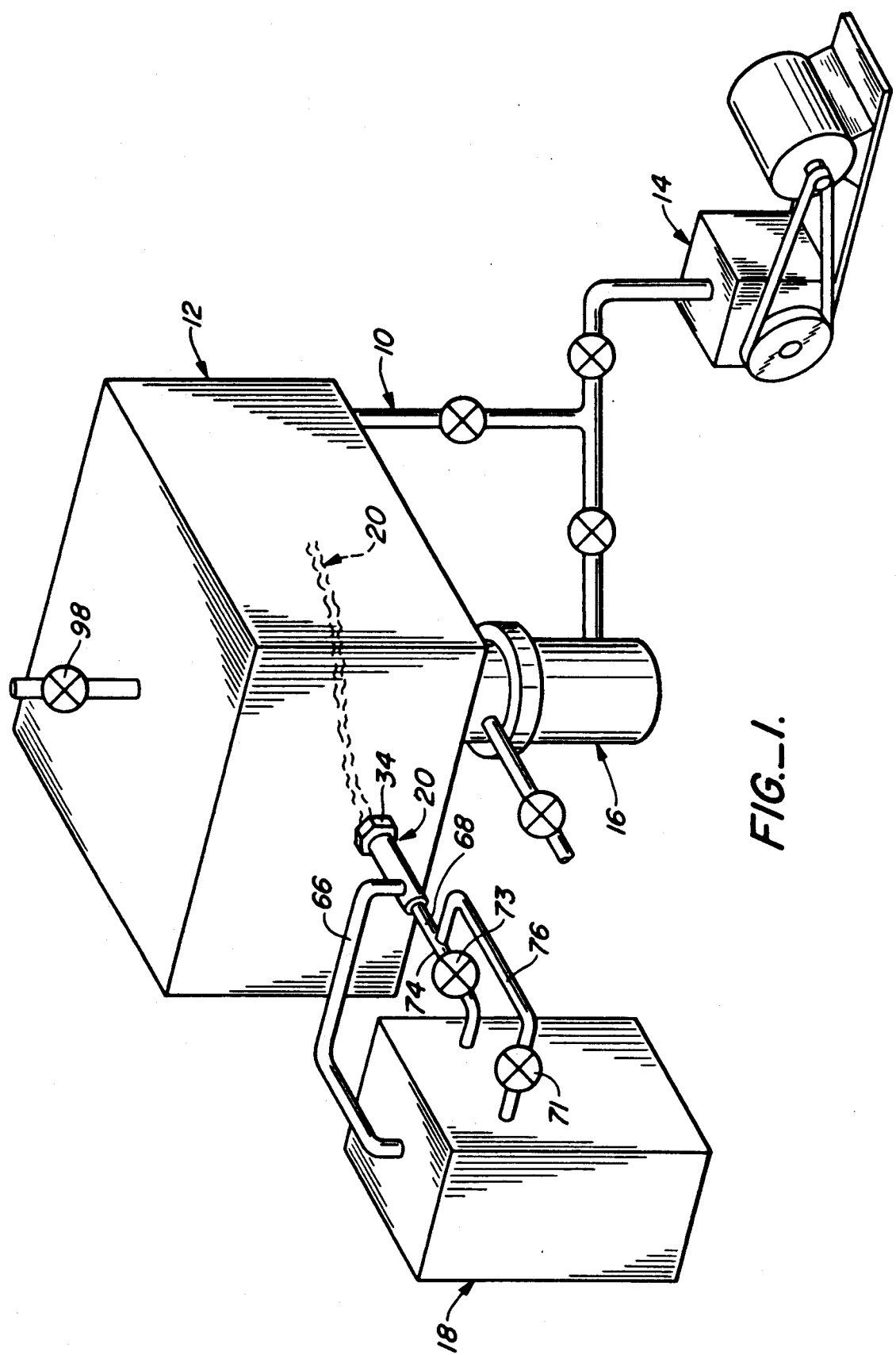
FIG._1.

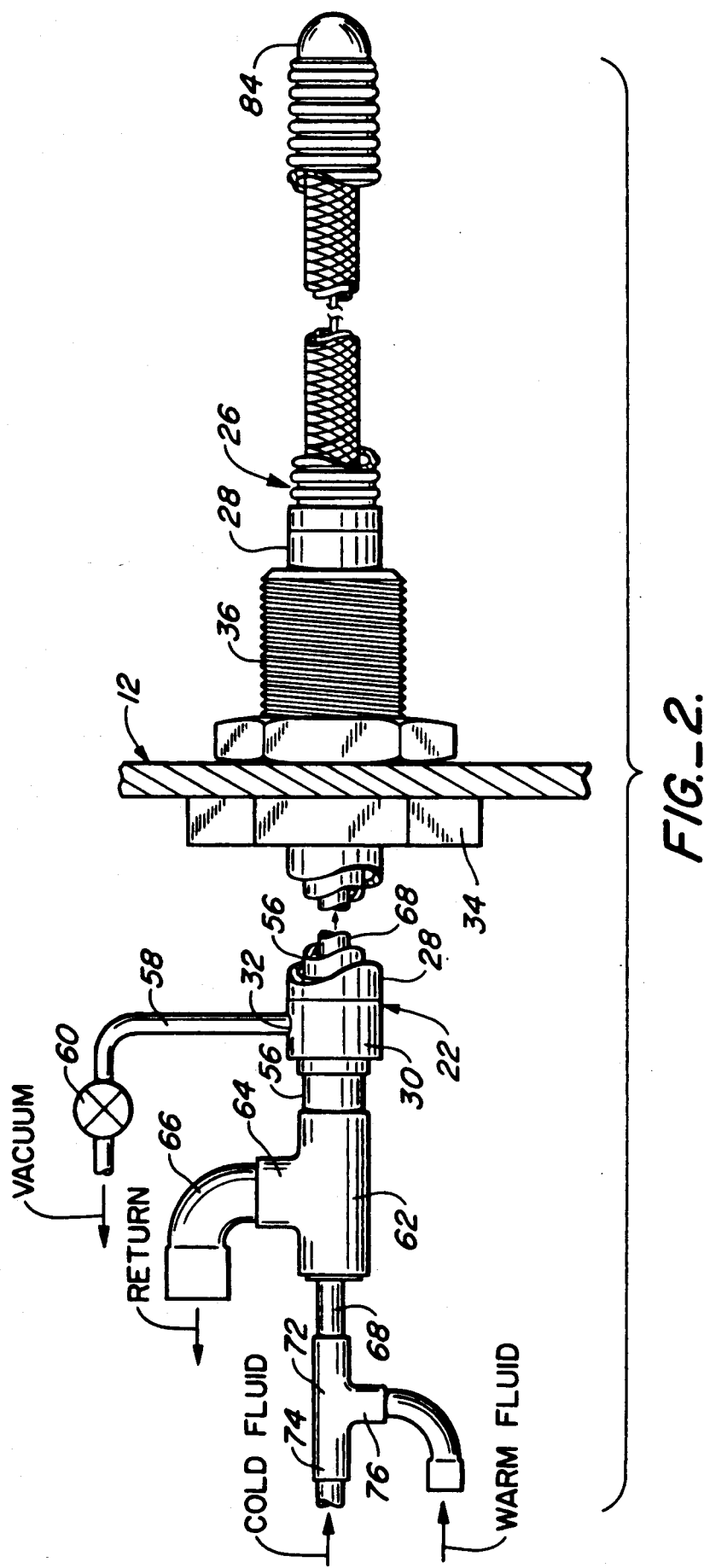
FIG._2.

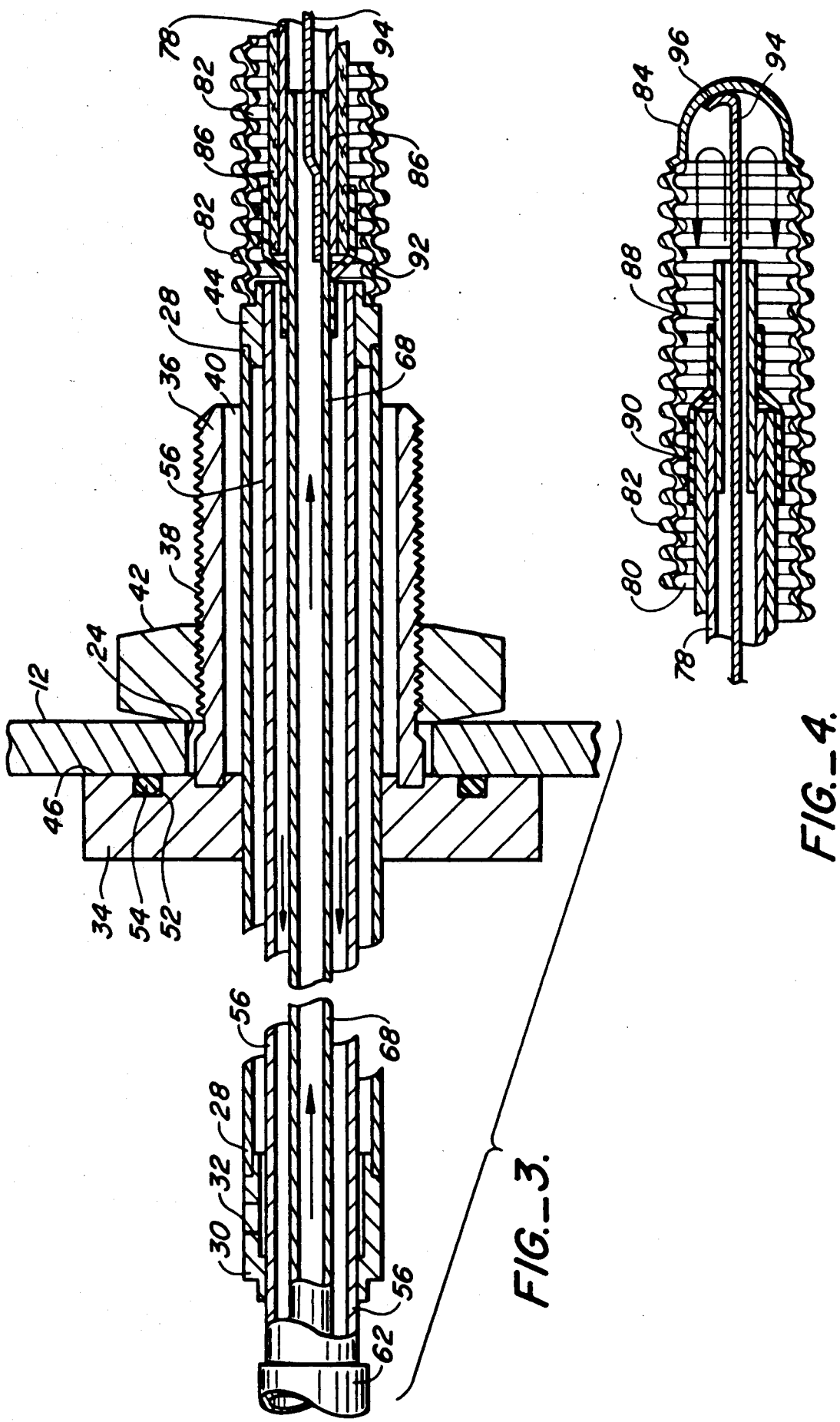

FAST CYCLE CRYOGENIC FLEX PROBE

This invention relates generally to vacuum systems and more particularly to a device for providing supplemental water vapor cryopumping from a vacuum chamber.

BACKGROUND OF THE INVENTION

Many industrial processes involving procedures such as film deposition or coating on various products must be performed in a vacuum chamber. The presence of water vapor prevents the achievement of the vacuum level required and also creates problems for the production vacuum coater which are well known. Vapor slows the pumpdown to processing levels, affects adhesion, loads mechanical forepumps, and also dissociates into oxygen and hydrogen. Both gasses adversely affect films.

In prior refrigeration systems, fast cycle water vapor cyropump devices utilizing a fixed "Meissner" coil have been provided for use in vacuum chambers as disclosed in U.S. Pat. Nos. 4,535,597 and 4,597,267 which are assigned to the assignee of the present application. In the devices described in the aforesaid patents, a fixed "Meissner" coil, installed in a vacuum chamber, receives supercold fluid to provide cryopumping of water vapor after the initial rough pumpdown phase and during a high vacuum pump phase of the operation cycle. For a subsequent defrost cycle, heat is derived from a hot refrigerant gas stream controllable by apparatus external to the vacuum chamber. One disadvantage with the prior fast cycle "Meissner" type cyropump devices, as described, was that they required a fixed installation of a coil having the "Meissner" surface within the vacuum chamber. Such installations were generally complicated and therefore time consuming as well expensive to install. Also, with a fixed cryopump coil within the vacuum chamber, the space available for different types of production coating equipment was limited, thus making it difficult to accommodate changes in equipment within the vacuum chamber.

To overcome the problems and limitations of the fixed fast cycle cryopumping devices, the present invention provides a flexible fast cycle probe that can be installed with relative ease and minimal time within a simple pass-through a single port in the wall of the vacuum chamber. Being flexible, the probe can be moved and configured in any desired manner within the vacuum chamber to avoid interference with coating apparatus or other equipment or fixtures within the chamber, while being completely temperature controlled from outside the chamber.

Another problem which the present invention has solved is the elimination of undesirable noise in the flexible probe due to the flow of gasses through it during its operation cycle.

SUMMARY OF THE INVENTION

In accordance with the principles of the invention a fast cycle cryopumping probe is provided comprising an input end section connected to an elongated, flexible body section. The input end is adapted to extend through and seal around an opening or pass-through in the sidewall of a vacuum chamber while the flexible body extends within the chamber in a suitable configuration that avoids interference with equipment therein. The input end is connected to a refrigeration unit that can supply, at different times, both a stream of supercooled fluid for cooling the probe and a heated gas to provide a defrosting or warming phase of the cycle. The flexible body section of the probe has a central tubular member of plastic or other suitable material which provides a passage for a refrigerant fluid or gas moving toward the outer end of the probe. Surrounding the central tube is a corrugated metal outer cover which forms an annular passageway for the fluid or gas as it circulates from the end of the probe and returns back to the input end. The combination of the corrugated metal outer cover and the inner tube provides a structure which can withstand temperature extremes and high pressure levels and yet provide the desired flexibility within the vacuum chamber. During some phases of the use cycle for the probe when the velocity of gas within the annular return passage reaches a high level, the flow past the corrugations may tend to create a high pitched noise. In accordance with another feature of the invention, this noise is eliminated by means of a knitted fabric which is held close to the outer surface of the inner plastic tube.

Other objects, advantages and features of the invention will become apparent from the following detailed description of one embodiment thereof presented in conjunction with the accompanying drawing.

BRIEF DESCRIPTION OF THE DRAWING

FIG. 1 is a diagrammatic view of a vacuum system including a fast cycle cryopumping flex probe embodying principles of the present invention.

FIG. 2 is a fragmentary view in elevation showing the flex probe of FIG. 1.

FIG. 3 is a fragmentary view in elevation and in section showing a head end portion of the flex probe assembly according to the invention.

FIG. 4 is a fragmentary view in elevation and in section showing a portion of the inner terminal end of the flex probe assembly of FIG. 3.

DETAILED DESCRIPTION OF EMBODIMENT

With reference to the drawing, FIG. 1 shows a system 10 for producing a vacuum in a chamber 12 of a type typically used for various coating or deposition processes that require extremely deep vacuum conditions. In broad terms, the system comprises a mechanical vacuum pump 14, a high vacuum pump 16, a refrigeration unit 18 for selectively supplying through suitable valves a relatively cold refrigerant and a relatively warm refrigerant and a fast cycle flex probe device 20 providing a "Meissner" trap function and embodying principles of the present invention, which is connected to the vacuum refrigeration unit.

Most vacuum processes of interest for use with this invention are production "batch" processes. A typical process comprises the evaporative coating of a microscopically thin material onto glass or plastic parts for enhanced optical performance. Such a process starts with the chamber open to atmosphere. Parts to be processed are then loaded into the chamber by the operator and coating materials are added at the same time. Process instruments may then be set or adjusted. When these operations are complete, the operator can close the chamber and begin the pumping sequence.

With the chamber closed, the operator would first begin pumping with the mechanical pump 14. This pump would be optimized to evacuate the chamber between atmospheric pressure (760 torr) and about 0.1 torr. (1 torr=1mm of mercury and is the most common method of measuring pressure for vacuum processing). Typically, this part of the pumping process would occur very quickly, i.e. a few minutes and is normally referred to as "rough pumping".

Below 0.1 torr the mechanical pump begins to lose efficiency and the operator switches to a "high vacuum" pump 16. This may be a diffusion pump, a turbo molecular pump or a helium cryopump. Depending on the final pressure desired and other factors, such as the cleanliness of the chamber and the type and location of the pump, this part of the process may take from 10–15 minutes to more than one hour. Comparing these times to the time required to perform the rough pumping it can be seen that this is the part of the cycle which can benefit most from supplemental pumping. It is this part of the process during which the Meissner type flex probe device 20 is used. Since the major portion of the "atmosphere" in the chamber is comprised of water vapor outgassed or desorbed from the interior surfaces, a system using the flex probe device 20, which is optimized to remove water vapor, provides the desired supplemental cryopumping.

High vacuum pumping is normally continued until a "base vacuum" is reached. This pressure may be lower than the desired processing pressure or, depending on the process, the operator may wish to begin his process as soon as the system has reached some pre-determined pressure. In processes where the base vacuum is lower than the desired processing pressure, the chamber may be "back-filled" with a specific gas to obtain a fixed pressure. Typical process pressures might range from $10^{-4}$ to $10^{-6}$ torr.

After the coating process within the vacuum chamber is completed, the high vacuum pumps are switched off and the chamber is vented (back-filled), allowing atmospheric air to enter the chamber. Venting generally takes only a few minutes for most vacuum systems. At this time the flex probe device 20 must be warmed to prevent moisture in the air from condensing onto it.

When the chamber is at atmospheric pressure it may be opened to remove the finished product. This is the end of the process cycle.

The flex probe device 20 embodying features of the present invention and capable of performing the aforesaid functions is shown in detail in FIGS. 2–4. Generally, it comprises a head end section 22 which extends within a feed through opening 24 in the vacuum chamber 12 and is connected to an elongated flexible section 26 which is adapted to remain within the chamber in any desired configuration which avoids interference with coating equipment therein (not shown).

As shown in FIGS. 2 and 3, the head end section comprises a rigid tube member 28, preferably of stainless steel, having an annular fitting 30 at its outer end with a side port 32. Spaced from the outer end of the tube member 28 is a sealing nut 34 to which is welded a sleeve 36 having external threads 38. The sleeve is coaxial with and spaced outwardly from the tube member 28 so as to form an annular space 40. Threaded to the sleeve 36 is a retaining nut 42, and attached to the inner end of the tube member 28 is an annular fitting 44.

On an inside surface 46 of the sealing nut 34 is a circular groove 52 which is concentric with the sleeve 36 and provides a seat for a sealing O-ring 54. When installed, the inside surface of the sealing nut fits flush against the outer surface of the vacuum chamber 12 surrounding the feed-through 24. When the retaining nut 42 is tightened on the sleeve, the 0-ring 54 provides a leak tight seal for the head end section 22 of the flex probe 20 around the chamber feed through. Other flange type sealing means could be used within the scope of the invention.

Extending through the rigid tube 28 from the inner annular fitting 44 and through the outer annular fitting 30 is an intermediate tube member 56. Thus, a confined annular compartment 50 is formed between the tubes 28 and 56 and the end fittings 30 and 44. As shown in FIG. 2, the port 32 in the outer fitting 30 is connected by a conduit 58 through a valved or otherwise sealed fitting 60 which is connectable to a vacuum source. This enables the annular compartment 50 to be evacuated and serve as an insulating jacket for the head end section 22 of the probe device which eliminates or greatly reduces connective heat transfer.

The intermediate tube member 56 extends outwardly from the end of the outer tube 28 and is connected to one end of a T-fitting 62.

A side branch 64 of the T-fitting provides a return passage 66 for circulated fluid and is adapted for connection with an appropriate return line connection (not shown) on the vacuum/refrigeration apparatus 18.

Concentrically located with the intermediate tube 56 is a rigid section 68 of a central feed tube for the probe device. This rigid section of the feed tube is preferably made from a metal material such as copper. The outer end of the feed tube section 68, as shown in FIG. 2, is connected to a T-fitting 72 having two inlet branches 74 and 76. One branch 74 is connected by a conduit to the cold fluid supply (not shown) and the other branch 76 is connected by another conduit to the warm fluid or gas supply (not shown), both cold and warm fluids being supplied through separate valves 71 and 73 by the external apparatus 18. (See FIG. 1.)

As shown in FIG. 3, an inner end of the rigid feed tube section 68 extends somewhat beyond the end of the intermediate tube 56 where it is connected to an elongated flexible feed tube section 78 of the central feed tube. This flexible section extends to near the end of the flexible section 82 of the probe device 20, which may have a total length of from 3 to 15 feet, depending on the operational requirements of the probe device.

The rigid and flexible central feed tube sections 68 and 78 provide the flow path for fluids into the flex probe device 20 during its operation within the chamber 12. To provide an annular return flow passage 80 a corrugated tube 82, preferably of stainless steel material, is provided concentrically around the flexible central feed tube 78, as shown in FIGS. 3 and 4. The concentric corrugated tube is spaced outwardly from the central tube to provide the annular return passage 80. At the outer end of the flexible probe section a dome like cap 84 is welded to the corrugated tube 82, as shown in FIG. 4.

The return passage 80 provided by the long, flexible, stainless steel 82, serves to reduce conductive heat transfer and thus helps to thermally isolate the returning cold or hot fluid (gas) from the near ambient temperature of the vacuum sealed flange assembly.

When the velocity of gas reaches a certain level within the annular return passage 80 of the flexible probe section 26, the turbulence due to the corrugations of the outer tube 82 tends to cause a high pitched noise. To attenuate such noise, the present invention provides for use of a sleeve of woven material 86 around the flexible central tube 78. Such fabric material when held close to and tightly around the central tube 78 serves to counteract the noise producing turbulence in such a manner that otherwise intolerable noise levels are substantially eliminated. Near the outer end of the flexible probe section 26 a short piece of tubing 88 extends into and projects from the end of the central tube 78. (See FIG. 4.) A tubular connector 90, preferably of vinyl material, fits tightly around the short tube 88 at one end, and its other end extends over the end of the central tube 78 and also the end of the fabric material 86 around it. When the vinyl connector 90 is heat sealed in place, it shrinks and holds the end of the fabric material firmly in place and tightly against the outer surface of the central tube 78. The fabric material is preferably made of durable plastic threads such as polyester, and it is woven in an annular configuration so that when placed under tension its diameter tends to decrease.

Near the inner end of the flexible central tube 78 the fabric tube 86 is held against the central tube surface by another vinyl tubular connector 92 which is also heat sealed to the tube 68 and the flexible tube 78, as shown in FIG. 3. When both vinyl connectors 90 and 92 are installed, the sleeve 86 is under tension and therefore is held closely to the surface of the central tube, thereby providing the necessary sound attenuation.

For some applications it may be desirable to increase the resistance to elongation of the flexible probe section 26 in order to better control its manipulation within a vacuum chamber. Thus, as shown in FIGS. 3 and 4 a tension or restraint wire 94 may be attached, by welding, to the end of the copper tube 68 and extend through the flexible tube 78. At its outer end the wire 94 may have a bent portion 96 which is preferably fixed to the inner surface of the end cap 84.

The operation of the flex probe device 20 in a high vacuum system may be described as follows:

The refrigeration unit 18 which provides relatively cold fluid refrigerant and a relatively warm gasseous refrigerant, may be an apparatus as shown in U.S. Pat. No. 4,535,597 and requires about one hour of internal precooling prior to initiating the vacuum process. Prior to this start-up the entire system 10 will be at an internal pressure of about 120 psig.

During rough pumping the flex probe device 20 is valved off from the unit 18, and internal pressure at this time may vary from 30 to 120 psig.

When the high vacuum pump 16 is activated, the cooling valve 73 on the refrigeration unit 18 is opened to allow cooling fluid to flow through inlet branch 74 of the fitting 72 and thus through the central feed tube 70. The flex probe device 20 within the chamber 12 is thereby cooled to a surface temperature of about $-130°$ C. within one or two minutes. This condition is maintained throughout the high vacuum portion of the process. During this time internal pressure within the probe device is about 15 to 30 psig. Gas velocities at this time are not high enough to cause noise within the probe.

Upon venting the vacuum chamber through a valve 96 the cooling valve 73 is closed and valve 71 is opened. Hot gas is then admitted through branch 76 of the fitting 72 to the flex probe device. Gas conditions in the flexible probe section 26 during this part of the cycle may reach 80° C. to 100° C. and 50 to 75 psig. Velocities, too, increase, thereby inducing vibrations in the corrugated sheath material 82 which cause undesirable noise unless attenuated by the fabric tube 86 as previously described. When surface temperatures are sufficiently high to remove all condensed water from the outer surface of the probe device 20 and to preclude the surface from condensing moisture from the atmosphere, the hot gas flow is interrupted and the device is valved off from the refrigeration unit 18 until the next cooling sequence is initiated.

As described, the flex probe device 20 provides an efficient means for providing supplemental cryopumping in a vacuum chamber and overcoming the adverse effects of excessive water vapor. The device can be quickly installed or removed and when used, it can be manipulated easily to avoid interference with equipment in the vacuum chamber.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. An elongated fast cycle cryopump probe device for use within a vacuum chamber having a wall section with a pass-through opening, said device comprising:

a rigid head end section adapted to be mounted on said wall section of said vacuum chamber while extending within a pass-through, said head end section having a feed tube and a return flow passage;

valve means connected to said feed tube means for selectively receiving either a relatively cold refrigerant or a relatively hot refrigerant during different phases of operation;

a flexible probe section connected to said rigid head end section which is capable of being shaped in different ways to assume a preselected or variable configuration within the vacuum chamber workspace, said probe section including a flexible feed tube connected to said feed tube means of said head end section for carrying said refrigerants passing through said head section outwardly to the end of said flexible probe section;

a flexible outer tubular member surrounding said flexible feed tube for providing a return passage for said refrigerants along said probe section and through said head section;

whereby when said cold refrigerant is flowing in said probe during a vacuum cycle within said chamber, water vapor is condensed on the outer surface of said flexible probe section and at the end of said cycle when said hot refrigerant is flowing in the probe, condensed water vapor is released from the flexible probe section to the surrounding atmosphere.

2. The probe device as described in claim 1 wherein said head section comprises said feed tube of rigid material and a concentric intermediate tube forming said return flow passage around said feed tube, a first fitting connected to said return passage, a second fitting connected on one end of said inner feed tube having separate branches, one said branch adapted to be connected to a source of cold refrigerant and the other said branch adapted to be connected to a source of hot refrigerant.

3. The probe device as described in claim 2 including an outer tube in said head end section forming a confined outer annular compartment around said intermediate tube, and means for evacuating and sealing said compartment in order to reduce or eliminate connective heat transfer.

4. The probe device as described in claim 1 including an outer annular mounting means adapted to fit around said chamber wall section surrounding said pass-through opening and having an inner face with sealing means seated therein; a threaded sleeve member attached to said mounting means, and a take-up nut means on said sleeve member for holding said mounted means in sealing engagement to said wall section of said chamber.

5. The probe device as described in claim 2 wherein said feed tube of said flexible probe section is made of a flexible material and is connected to said rigid feed tube of said head section; said outer flexible member comprising a corrugated metal surrounding said flexible feed tube and forming said return passage along its length which is connected to the said return passage of said head end section; and an end cap spaced from the outer end of said flexible feed tube and fixed to the outer end of said outer flexible member.

6. The probe device as described in claim 5 including a noise attenuating means surrounding the outer surface of said flexible feed tube along its length.

7. The probe device as described in claim 6 wherein said noise attenuating means comprises a woven fabric material.

8. The probe device as described in claim 7 wherein said woven fabric material is comprised of polyester threads.

9. The probe device as described in claim 7 wherein said woven fabric material is in the form of a tube of cross woven threads, wherein the diameter of the tube tends to decrease when tension is applied to the ends of the tube.

10. The probe device as described in claim 9 including retaining means near the opposite ends of said flexible feed tube for holding said woven fabric tube around it under tension and close to the surface of said flexible feed tube.

11. The probe device as described in claim 9 wherein said retaining means at each opposite end of said flexible central feed tube comprises a vinyl tube connector which is heat sealed in place around a portion of said fabric material.

12. The probe device as described in claim 5 wherein said central feed tube is made from polytetraflourethylene plastic and said corrugated metal is stainless steel.

13. The probe device as described in claim 1 including restraint means within said flexible tube and extending along at least a portion of its length for increasing the stiffness and controllability of said flexible probe section.

14. The probe device as described in claim 13 wherein said restraint means comprises a wire member connected on its inner end to said feed tube in said head end section and connected at an outer end to said end cap of said flexible probe section.

* * * * *